(12) United States Patent
Kimura et al.

(10) Patent No.: US 9,159,352 B2
(45) Date of Patent: Oct. 13, 2015

(54) POLISHING LIQUID COMPOSITION FOR MAGNETIC DISK SUBSTRATE

(75) Inventors: Yosuke Kimura, Wakayama (JP); Takeshi Hamaguchi, Wakayama (JP); Makoto Suzuki, Wakayama (JP)

(73) Assignee: KAO CORPORATION, Tokyo (JP)

( * ) Notice: Subject to any disclaimer, the term of this patent is extended or adjusted under 35 U.S.C. 154(b) by 99 days.

(21) Appl. No.: 13/325,938

(22) Filed: Dec. 14, 2011

(65) Prior Publication Data

US 2012/0156968 A1    Jun. 21, 2012

(30) Foreign Application Priority Data

Dec. 16, 2010 (JP) ................................ 2010-280865
Sep. 20, 2011 (JP) ................................ 2011-204410

(51) Int. Cl.
*B24D 3/02* (2006.01)
*C09C 1/68* (2006.01)
*C09K 3/14* (2006.01)
*G11B 5/84* (2006.01)
*B24B 37/04* (2012.01)

(52) U.S. Cl.
CPC ............ *G11B 5/8404* (2013.01); *B24B 37/044* (2013.01); *C09K 3/1463* (2013.01)

(58) Field of Classification Search
None
See application file for complete search history.

(56) References Cited

U.S. PATENT DOCUMENTS

| | | | | |
|---|---|---|---|---|
| 3,686,151 | A * | 8/1972 | Keim | ............................ 528/332 |
| 6,123,603 | A | 9/2000 | Tada et al. | |
| 6,258,277 | B1 * | 7/2001 | Salmen et al. | ................ 210/638 |
| 6,403,726 | B1 * | 6/2002 | Ward | ........................ 525/328.3 |
| 7,059,941 | B2 * | 6/2006 | Yoshida et al. | .................. 451/41 |
| 7,247,082 | B2 * | 7/2007 | Yoshida et al. | .................. 451/41 |
| 7,666,238 | B2 | 2/2010 | Fujii et al. | |
| 2003/0041526 | A1 | 3/2003 | Fujii et al. | |
| 2003/0047710 | A1* | 3/2003 | Babu et al. | ................... 252/79.1 |
| 2004/0102142 | A1* | 5/2004 | Yoshida et al. | .................. 451/41 |
| 2004/0229552 | A1 | 11/2004 | Cherian et al. | |
| 2005/0032465 | A1 | 2/2005 | Fujii et al. | |
| 2005/0178742 | A1* | 8/2005 | Chelle et al. | ..................... 216/88 |
| 2005/0233097 | A1* | 10/2005 | Tojo et al. | .................. 428/32.26 |
| 2006/0112647 | A1 | 6/2006 | Fujii et al. | |
| 2007/0157524 | A1 | 7/2007 | Lortz et al. | |
| 2008/0160881 | A1 | 7/2008 | Fujii et al. | |
| 2008/0280538 | A1 | 11/2008 | Fujii et al. | |
| 2009/0014415 | A1* | 1/2009 | Chelle et al. | ..................... 216/53 |
| 2009/0111359 | A1* | 4/2009 | Suzuki et al. | .................. 51/308 |
| 2009/0250656 | A1* | 10/2009 | Siddiqui et al. | ............. 252/79.1 |
| 2011/0039475 | A1* | 2/2011 | Hoshi et al. | ..................... 51/298 |

FOREIGN PATENT DOCUMENTS

| | | |
|---|---|---|
| CN | 1630697 A | 6/2005 |
| CN | 1938393 A | 3/2007 |
| EP | 1 331 254 A1 | 7/2003 |
| JP | 11-10492 A | 1/1999 |
| JP | 2003-147338 A | 5/2003 |
| JP | 2005-63530 A | 3/2005 |
| JP | 2005-515646 A | 5/2005 |
| JP | 2006-150534 A | 6/2006 |
| JP | 2008-252022 A | 10/2008 |
| JP | 2009-176397 A | 8/2009 |
| JP | 2010-541203 A | 12/2010 |
| WO | WO 03/062338 A1 | 7/2003 |
| WO | WO 2009/042072 A2 | 4/2009 |
| WO | WO 2009131133 A1 * | 10/2009 ............... C09K 3/14 |

OTHER PUBLICATIONS

Chinese Office Action to Chinese Application No. 201110411215.9 dated Mar. 3, 2014, with English translation.

* cited by examiner

*Primary Examiner* — Kaj K Olsen
*Assistant Examiner* — Ross J Christie
(74) *Attorney, Agent, or Firm* — Birch, Stewart, Kolasch & Birch, LLP

(57) ABSTRACT

The present invention provides a polishing liquid composition for a magnetic disk substrate that can reduce residual inorganic particles and scratches without loss of productivity and a method of producing a magnetic disk substrate using the polishing liquid composition. The polishing liquid composition contains inorganic particles, a diallylamine polymer, an acid and water, the diallylamine polymer includes one or more constitutional units selected from those represented by the following general formulas (I-a), (I-b), (I-c) and (I-d), and the content of the diallylamine polymer in the polishing liquid composition is 0.008 to 0.100 wt %

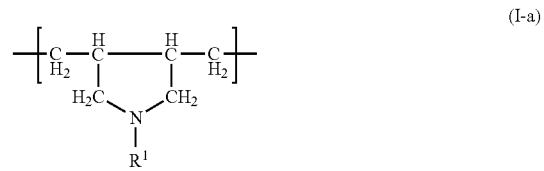

(I-a)

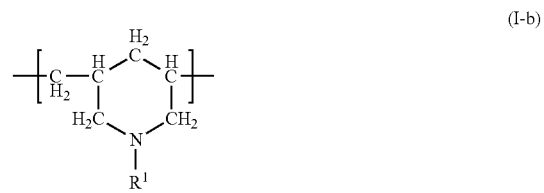

(I-b)

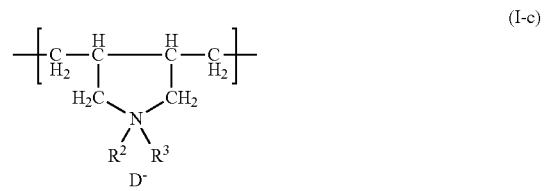

(I-c)

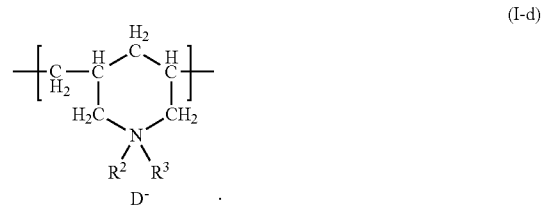

(I-d)

18 Claims, No Drawings

POLISHING LIQUID COMPOSITION FOR MAGNETIC DISK SUBSTRATE

BACKGROUND OF INVENTION

1. Field of the Invention

The present invention relates to a polishing liquid composition for a magnetic disk substrate and to a method of producing a magnetic disk substrate using the polishing liquid composition.

2. Description of Related Art

With the recent advances in the reduction in size and the increase in capacity of magnetic disk drives, there is a need to increase the recording density. To increase the recording density, there have been developed techniques for further improving the detection sensitivity for a magnetic signal weakened due to a reduction in the unit recording area by reducing the flying height of magnetic heads. In order to take measures for reducing the flying height of magnetic heads and ensuring the recording area, the requirements for magnetic disk substrates are becoming increasingly stringent, with regard to the improvement of smoothness and flatness (the reduction of surface roughness, waviness, and roll-off) and the reduction of surface defects (the reduction of residual abrasive grains, scratches, protrusions, pits and the like).

To meet such requirements, methods of producing the hard disk substrates usually employ a multistage polishing system that includes two or more polishing steps in terms of improving both the productivity and the surface quality such as better smoothness and less scratches. Generally, a polishing liquid composition for finishing containing colloidal silica particles is used in the final polishing step of the multistage polishing system, in other words, in the polishing step for finishing in order to meet such requirements as reductions in the surface roughness, scratches, projections and flaws such as pits, and a polishing liquid composition containing alumina particles is used in prior polishing steps (referred also to as rough polishing steps) to the polishing step for finishing in terms of improving the productivity (e.g., JP 2005-63530 A and JP 11-010492 A).

However, the use of alumina particles as abrasive grains may lead to defects in the media due to texture scratches caused by the embedding of the alumina particles into the substrates. In order to solve this problem, a polishing liquid composition containing alumina particles having a certain particle size and silica particles having a certain particle size distribution is proposed (e.g., JP 2009-176397 A).

Further, when abrasive grains used in the rough polishing steps remain on the hard disk substrates, it may induce scratches and pits during the polishing process for finishing, so that the yields of the substrates may drop. In order to solve this problem, a polishing liquid composition containing an organic nitrogen compound having two or more amino and/or imino groups in the molecules is proposed (JP 2006-150534 A).

Furthermore, to modify the surface of the objects to be polished to adjust the polishing rate, polishing liquid compositions containing an organic nitrogen compound having two or more amino and/or imino groups in the molecules are proposed (JP 2008-252022 A, JP 2010-541203 A and JP 2005-515646 A).

SUMMARY OF THE INVENTION

Viewed from one aspect, the present invention relates to a polishing liquid composition for a magnetic disk substrate, which contains inorganic particles, a diallylamine polymer, an acid and water. The diallylamine polymer includes one or more constitutional units selected from the group consisting of constitutional units represented by the following general formulas (I-a), (I-b), (I-c) and (I-d), and the content of the diallylamine polymer in the polishing liquid composition is 0.008 to 0.100 wt %.

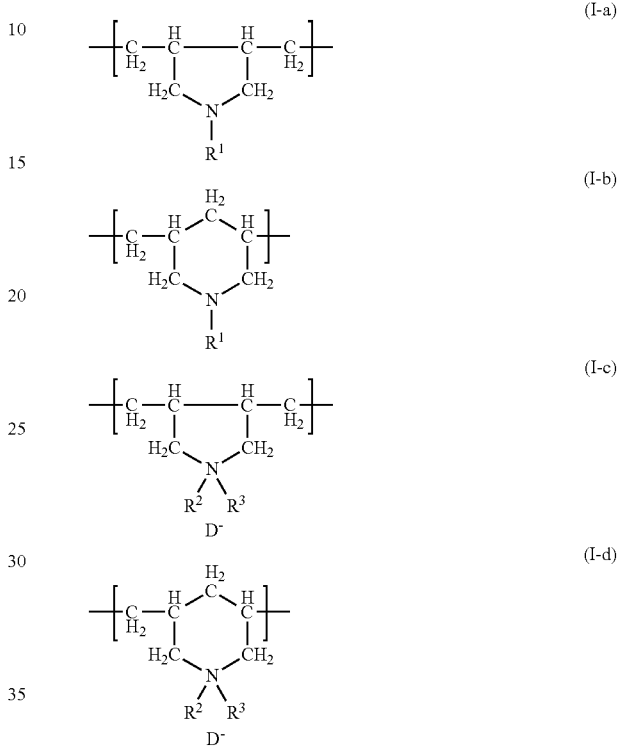

Where $R^1$ in the general formulas (I-a) and (I-b) is a hydrogen atom or an alkyl group having a carbon number of 1 to 10 or aralkyl group having a carbon number of 7 to 10 that may have a hydroxyl group, $R^2$ in the general formulas (I-c) and (I-d) is an alkyl group having a carbon number of 1 to 10 or aralkyl group having a carbon number of 7 to 10 that may have a hydroxyl group, $R^3$ is an alkyl group having a carbon number of 1 to 4 or aralkyl group having a carbon number of 7 to 10 and $D^-$ is a monovalent anion.

Viewed from another aspect, the present invention relates to a method of producing a magnetic disk substrate, which includes a step of polishing an Ni—P plated aluminum alloy substrate or glass substrate using the polishing liquid composition of the present invention. Further, viewed from still another aspect, the present invention relates to a method of polishing a magnetic disk substrate, which includes a step of polishing an Ni—P plated aluminum alloy substrate or glass substrate using the polishing liquid composition of the present invention.

DETAILED DESCRIPTION OF THE INVENTION

As the magnetic disk drives have grown in capacity, the characteristics required for the surface quality of the substrates have become increasingly stringent. Thus, there are demands for the development of a polishing liquid composition that can further reduce the amount of inorganic particles such as alumina particles remaining on the substrates (e.g., the adherence, embedding, etc. of the alumina particles) in the rough polishing steps while maintaining the productivity.

With the foregoing in mind, the present invention provides a polishing liquid composition that leaves less inorganic particles such as alumina particles on the substrate surface and can reduce scratches on the substrate surface without loss of the productivity, and a method of producing a magnetic disk substrate using the polishing liquid composition.

Viewed from one aspect, the present invention relates to a polishing liquid composition for a magnetic disk substrate, which contains inorganic particles, a diallylamine polymer, an acid and water. The diallylamine polymer includes one or more constitutional units selected from the group consisting of constitutional units represented by the following general formulas (I-a), (I-b), (I-c) and (I-d), and the content of the diallylamine polymer in the polishing liquid composition is 0.008 to 0.100 wt %.

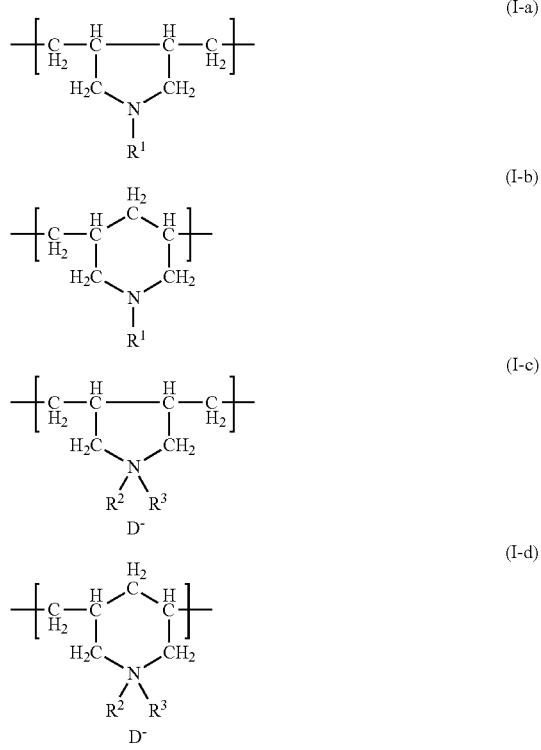

Where $R^1$ in the general formulas (I-a) and (I-b) is a hydrogen atom or an alkyl group having a carbon number of 1 to 10 or aralkyl group having a carbon number of 7 to 10 that may have a hydroxyl group, $R^2$ in the general formulas (I-c) and (I-d) is an alkyl group having a carbon number of 1 to 10 or aralkyl group having a carbon number of 7 to 10 that may have a hydroxyl group, $R^3$ is an alkyl group having a carbon number of 1 to 4 or aralkyl group having a carbon number of 7 to 10 and $D^-$ is a monovalent anion.

Viewed from another aspect, the present invention relates to a method of producing a magnetic disk substrate, which includes a step of polishing an Ni—P plated aluminum alloy substrate or glass substrate using the polishing liquid composition of the present invention. Further, viewed from still another aspect, the present invention relates to a method of polishing a magnetic disk substrate, which includes a step of polishing an Ni—P plated aluminum alloy substrate or glass substrate using the polishing liquid composition of the present invention.

The use of the polishing liquid composition of the present invention allows the efficient production of substrates with reduced residual inorganic particles (e.g., residual alumina) and scratches after polishing without loss of the productivity. Consequently, magnetic disk substrates of improved substrate quality can be produced in a productive manner.

The term "residual inorganic particles" or "residual alumina" used herein refers to the embedding of inorganic particles or alumina particles into a substrate and/or the adherence of inorganic particles or alumina particles to a substrate after polishing the substrate using the inorganic particles or alumina particles primarily as abrasive grains.

The present invention is based upon the findings that the use of a polishing liquid composition containing a diallylamine polymer in polishing a substrate can result in reductions in residual inorganic particles (residual alumina) and scratches on the substrate after the polishing without loss of the polishing rate. Furthermore, the present invention is based upon the findings that the effect of reducing residual inorganic particles (residual alumina) and scratches on the substrate after the polishing while maintaining the polishing rate can be further improved when the content of the diallylamine polymer in the polishing liquid composition is within a range of 0.008 and 0.100 wt % in use.

That is, viewed from one aspect, the present invention relates to a polishing liquid composition for a magnetic disk substrate (hereinafter referred also to as the "polishing liquid composition of the present invention"), which contains inorganic particles, a diallylamine polymer, an acid and water. The diallylamine polymer includes one or more constitutional units selected from the group consisting of constitutional units represented by the following general formulas (I-a), (I-b), (I-c) and (I-d), and the content of the diallylamine polymer in the polishing liquid composition is 0.008 to 0.100 wt %. The term "content of a component in the polishing liquid composition" used herein refers to the content of the component at the time of using the polishing liquid composition in polishing. Hence, when the polishing liquid composition of the present invention is produced in the form of a concentrate, the content of the component may increase by the degree to which the polishing liquid composition is concentrated.

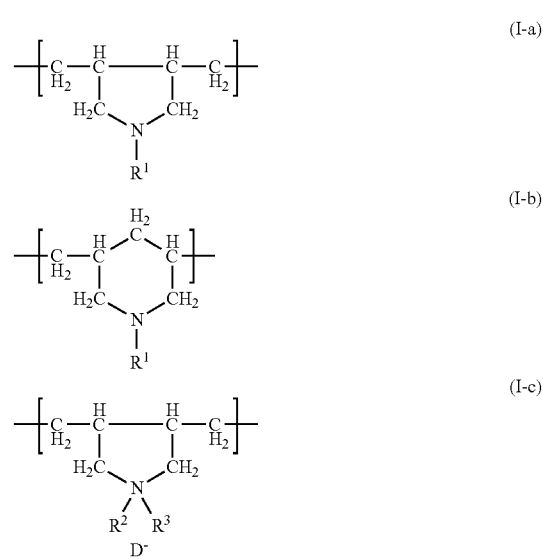

-continued

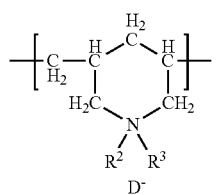

(I-d)

Where $R^1$ in the general formulas (I-a) and (I-b) is a hydrogen atom or an alkyl group having a carbon number of 1 to 10 or aralkyl group having a carbon number of 7 to 10 that may have a hydroxyl group, $R^2$ in the general formulas (I-c) and (I-d) is an alkyl group having a carbon number of 1 to 10 or aralkyl group having a carbon number of 7 to 10 that may have a hydroxyl group, $R^3$ is an alkyl group having a carbon number of 1 to 4 or aralkyl group having a carbon number of 7 to 10, and $D^-$ is a monovalent anion.

Although it is not clear as to the reasons why the use of the polishing liquid composition of the present invention allows reductions in residual inorganic particles (e.g., residual alumina) in an effective manner, it can be assumed that the diallylamine polymer adheres to the substrate surface and to the inorganic particles and imparts positive electrical charges to the substrate and the inorganic particles, so that the repulsion between the charges prevents the inorganic particles from remaining on the substrate surface. Further, although it is not clear as to the reasons why the use of the polishing liquid composition of the present invention allows reductions in scratches in an effective manner, it can be assumed that the diallylamine polymer adheres to the substrate surface to form a protective film thereon, so that deep cuts caused locally by the inorganic particles (e.g., alumina particles) are prevented, thereby reducing the scratches. On the other hand, although it is not clear as to the reasons why the use of the polishing liquid composition of the present invention allows the maintenance of a high polishing rate, it can be assumed that the strength at which the diallylamine polymer adheres to the substrate is adequate, so that the adherence of the diallylamine polymer to the substrate does not interfere with a mechanical polishing force provided by the inorganic particles (e.g., alumina particles) to a large degree, allowing the maintenance of a high polishing rate. However, the present invention may not be limited to these mechanisms.

[Inorganic Particles]

Inorganic particles that are generally used as abrasive grains in polishing liquid compositions can be used in the present invention as the inorganic particles. Examples of such inorganic particles include: metals; carbides, nitrides, oxides and borides of metals or metalloids; and diamond. Metal or metalloid elements are those belonging to Group 2A, 2B, 3A, 3B, 4A, 4B, 5A, 6A, 7A and 8 in the periodic table (long period form). Specific examples of the inorganic particles include alumina particles, silicon carbide particles, diamond particles, magnesium oxide particles, zinc oxide particles, ceric oxide particles, titanium oxide particles, zirconium oxide particles and silica particles. Among these examples, alumina particles, ceric oxide particles, zirconium oxide particles and silica particles are preferable, and alumina particles and silica particles are more preferable in terms of improving the polishing rate and the surface quality.

[Alumina Particles]

In terms of improving the polishing rate, the alumina particles to be used in the present invention are preferably of α-alumina. Further, in terms of reducing the waviness and roughness of the substrate surface, the alumina particles are preferably of intermediate alumina. The term intermediate alumina is a generic term used to describe crystalline alumina particles other than α-alumina. Specific examples of intermediate alumina include γ-alumina, δ-alumina, θ-alumina, η-alumina, κ-alumina and a mixture thereof. Among these examples, γ-alumina, δ-alumina, θ-alumina, and a mixture thereof are preferable, γ-alumina and θ-alumina are more preferable and θ-alumina is still more preferable in terms of reducing the waviness and roughness of the substrate surface and improving the polishing rate. In terms of improving the polishing rate and reducing the waviness and roughness of the substrate surface and residual alumina, it is preferable to use a mixture of α-alumina and intermediate alumina, and more preferable to use a mixture of α-alumina and θ-alumina.

In terms of improving the polishing rate and reducing residual alumina, the content of α-alumina in the alumina particles is preferably 30 to 90 wt %, more preferably 40 to 85 wt %, even more preferably 50 to 80 wt % and still more preferably 60 to 80 wt %. Further, in terms of improving the polishing rate and reducing the waviness and residual alumina, the content of intermediate alumina in the alumina particles is preferably 10 to 70 wt %, more preferably 15 to 60 wt %, even more preferably 20 to 50 wt %, still more preferably 20 to 40 wt %, and still more preferably 20 to 30 wt %.

When using α-alumina and intermediate alumina in combination, the weight ratio of the α-alumina to the intermediate alumina (percent by weight of α-alumina/percent by weight of intermediate alumina) is preferably 95/5 to 10/90, more preferably 90/10 to 40/60, even more preferably 85/15 to 50/50, still more preferably 85/15 to 60/40, still more preferably 85/15 to 65/35, still more preferably 85/15 to 70/30, and still more preferably 80/20 to 70/30 in terms of improving the polishing rate and reducing the waviness of the substrate surface and residual alumina.

In terms of improving the polishing rate and reducing the waviness of the substrate surface and residual alumina, the secondary particles of the alumina particles have an average particle size of preferably 0.01 to 0.8 μm, more preferably 0.1 to 0.6 μm, even more preferably 0.2 to 0.5 μm, and still more preferably 0.25 to 0.4 μm. Note that the average particle size can be determined by a method described in Examples.

In terms of improving the polishing rate and reducing the waviness of the substrate surface and residual alumina, the secondary particles of the α-alumina have an average particle size of preferably 0.1 to 0.8 μm, more preferably 0.15 to 0.6 μm, even more preferably 0.18 to 0.5 μm, and still more preferably 0.2 to 0.4 μm. Note that the average particle size of the secondary particles of the α-alumina can be determined by the same method as the one used for the alumina particles.

In terms of improving the polishing rate and reducing the waviness of the substrate surface and residual alumina, the secondary particles of the intermediate alumina have an average particle size of preferably 0.05 to 0.5 μm, more preferably 0.08 to 0.4 μm, even more preferably 0.1 to 0.35 μm, still more preferably 0.1 to 0.3 μm, and still more preferably 0.1 to 0.2 μm. Note that the average particle size of the secondary particles of the intermediate alumina can be determined by the same method as the one used for the alumina particles.

When using the α-alumina and the intermediate alumina in combination, the ratio of the α-alumina to the intermediate alumina in average secondary particle size (α-alumina/intermediate alumina) is preferably 0.5 to 10, more preferably 1 to 5, and still more preferably 1.5 to 3 in terms of improving the polishing rate and reducing the waviness and roughness of the substrate surface and residual alumina.

The content of the alumina particles in the polishing liquid composition is preferably 0.05 wt % or more, more preferably 0.1 wt % or more, even more preferably 0.5 wt % or more, and still more preferably 0.75 wt % or more in terms of improving the polishing rate. Further, in terms of reducing the waviness of the substrate surface and residual alumina, the content of the alumina particles is preferably 30 wt % or less, more preferably 20 wt % or less, even more preferably 15 wt % or less, and still more preferably 10 wt % or less. In terms of improving the polishing rate and reducing the waviness of the substrate surface and residual alumina, the content of the alumina particles in the polishing liquid composition is preferably 0.05 to 30 wt %, more preferably 0.1 to 20 wt %, even more preferably 0.5 to 15 wt %, still more preferably 0.75 to 10 wt %, still more preferably 0.8 to 5 wt %, and still more preferably 0.9 to 1.2 wt %.

[Diallylamine Polymer]

The term "diallylamine polymer" used herein refers to a polymer having constitutional units in which amine compounds (diallylamines) having two allyl groups are introduced as monomers. The diallylamine polymer used in the present invention is water soluble. Here, being "water soluble" means that the diallylamine polymer has solubility of 2 g or more relative to 100 g of water at 20° C. It can be considered that the diallylamine polymer becomes positively charged in an acidic polishing liquid and adheres to the substrate surface to form a protective film thereon, thereby reducing residual inorganic particles (residual alumina) and scratches.

The diallylamine polymer contained in the polishing liquid composition of the present invention has one or more constitutional units selected from the group consisting of constitutional units represented by the following general formulas (I-a), (I-b), (I-c) and (I-d) in terms of reducing residual inorganic particles (residual alumina) and scratches.

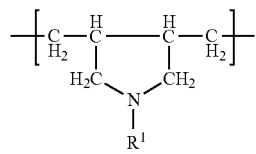

(I-a)

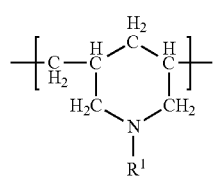

(I-b)

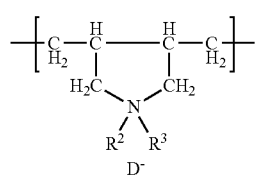

(I-c)

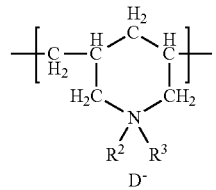

(I-d)

$R^1$ in the general formulas (I-a) and (I-b) is a hydrogen atom or an alkyl group having a carbon number of 1 to 10 or aralkyl group having a carbon number of 7 to 10 that may have a hydroxyl group. In terms of reducing residual inorganic particles (residual alumina) and scratches, $R^1$ is preferably a hydrogen atom or alkyl group having a carbon number of 1 to 10 that may have a hydroxyl group. Here, the alkyl group having a carbon number of 1 to 10 that may have a hydroxyl group may be a straight-chain, branched-chain or cyclic alkyl group. In terms of reducing residual alumina, $R^1$ is preferably an alkyl group having a carbon number of 1 to 4 that may have a hydroxyl group, more preferably a methyl group, ethyl group, n-propyl group, isopropyl group, any of various butyl groups, 2-hydroxyethyl group, 2-hydroxypropyl group, or 3-hydroxypropyl group that may have a hydroxyl group, even more preferably a methyl group or ethyl group that may have a hydroxyl group, and still more preferably a methyl group that may have a hydroxyl group. Preferred examples of aralkyl groups having a carbon number of 7 to 10 include a benzyl group and a phenethyl group in terms of reducing residual inorganic particles (residual alumina) and scratches. Among these examples, $R^1$ is preferably a hydrogen atom, methyl group, ethyl group or benzyl group, more preferably a hydrogen atom, methyl group or ethyl group, even more preferably a hydrogen atom or methyl group, and still more preferably a methyl group in terms of reducing residual inorganic particles (residual alumina) and scratches. When the diallylamine polymer includes the constitutional units represented by the general formulas (I-a) and (I-b), $R^1$ may be the same or may not be the same.

The constitutional units represented by the general formulas (I-a) and (I-b) may be in the form of acid addition salts. Examples of acid addition salts include hydrochlorides, hydrobromates, acetates, sulfates, nitrates, sulfites, phosphates, amidosulfates and methansulfonates. Among these examples, hydrochlorides, hydrobromates and acetates are preferable and hydrochlorides are more preferable in terms of reducing residual inorganic particles (residual alumina) and scratches.

$R^2$ in the general formulas (I-c) and (I-d) is an alkyl group having a carbon number of 1 to 10 or aralkyl group having a carbon number of 7 to 10 that may have a hydroxyl group. Preferred forms of the alkyl group having a carbon number of 1 to 10 or aralkyl group having a carbon number of 7 to 10 that may have a hydroxyl group are as described with regard to $R^1$ above.

In the general formulas (I-c) and (I-d), $R^3$ is an alkyl group having a carbon number of 1 to 4 or aralkyl group having a carbon number of 7 to 10, and $D^-$ is a monovalent anion.

The alkyl group having a carbon number of 1 to 4 may be a straight-chain or branched-chain alkyl group, and examples of such an alkyl group include a methyl group, an ethyl group, a propyl group, an isopropyl group and various butyl groups. Among these examples, a methyl group and an ethyl group are preferable in terms of reducing residual inorganic particles (residual alumina) and scratches. In terms of reducing residual inorganic particles (residual alumina) and scratches, preferred examples of the aralkyl group having a carbon number of 7 to 10 include a benzyl group and a phenethyl group. Examples of the monovalent anion represented by D⁻ include halogen ion, methyl sulfate ion and ethyl sulfate ion.

Specific examples of a partial structure represented by >N⁺R²R³.D⁻ (a partial structure of the quaternary ammonium salt constitutional unit) in the general formulas (I-c) and (I-d) include N,N-dimethylammonium chloride, N,N-diethylammonium chloride, N,N-dipropylammonium chloride, N,N-dibutylammonium chloride, N-methyl-N-benzylammonium chloride, N-ethyl-N-benzylammonium chloride, N-methyl-N-ethylammonium chloride, and bromides, iodides, methyl sulfates, and ethyl sulfates corresponding to these chlorides. Among these examples, N,N-dimethylammonium chloride, N,N-diethylammonium chloride, N,N-diethylammonoium ethyl sulfate and N-methyl-N-ethylammonium ethyl sulfate are preferable from an economic standpoint.

Among the constitutional units represented by the general formulas (I-a), (I-b), (I-c) and (I-d), it is preferable that the diallylamine polymer includes one or more constitutional units selected from the constitutional units represented by the general formulas (I-a) and (I-c), and it is more preferable that the diallylamine polymer includes the constitutional unit represented by the general formula (I-c) in terms of reducing residual inorganic particles (residual alumina) and scratches.

In terms of reducing residual inorganic particles (residual alumina) and scratches as well as improving the polishing rate, the total of the constitutional units represented by the general formulas (I-a), (I-b), (I-c) and (I-d) accounts for preferably 30 to 100 mol %, more preferably 35 to 90 mol %, even more preferably 40 to 80 mol % and still more preferably 40 to 60 mol % of all of the constitutional units of the diallylamine polymer in content.

In terms of reducing scratches, it is preferable that the diallylamine polymer further includes a constitutional unit represented by the following general formula (II).

(II)

In terms of reducing residual inorganic particles (residual alumina) and scratches as well as improving the polishing rate, the constitutional unit represented by the general formula (II) accounts for preferably 10 to 60 mol %, more preferably 20 to 60 mol %, even more preferably 30 to 60 mol %, and still more preferably 40 to 60 mol % of all of the constitutional units of the diallylamine polymer in content.

In terms of reducing residual inorganic particles (residual alumina) and scratches as well as improving the polishing rate, the mole ratio of the constitutional units represented by the general formulas (I-a) to (I-d) to the constitutional unit represented by the general formula (II) (general formulas (I-a) to (1-d)/general formula (II)) in all of the constitutional units of the diallylamine polymer is preferably 90/10 to 30/70, more preferably 80/20 to 40/60, even more preferably 70/30 to 40/60, and still more preferably 60/40 to 40/60.

The diallylamine polymer may include constitutional units other than those represented by the general formulas (I-a) to (I-d) and (II). Examples of such constitutional units include those derived from ethylenically unsaturated sulfonic acid compounds, ethylenically unsaturated carboxylic acid compounds, acrylamide compounds and triallylamine.

Examples of the ethlenically unsaturated sulfonic acid compounds include styrenesulfonic acid, α-methylstyrenesulfonic acid, vinyltoluenesulfonic acid, vinylnaphthalenesulfonic acid, vinylbenzylsulfonic acid, 2-acrylamide-2-methylpropanesulfonic acid, acryloyloxyethylsulfonic acid and methacryloyloxypropylsulfonic acid. These sulfonic acids may also be used in the form of alkali metal salts and ammonium salts. Examples of alkali metal salts include lithium salt, sodium salt and potassium salt. Among these examples, styreneiilfonic acid, 2-acrylamide-2-methylpropanesulfonic acid, and sodium salts thereof are preferable in terms of reducing residual inorganic particles (residual alumina) and scratches as well as improving the polishing rate.

Examples of the ethylenically unsaturated carboxylic acid compounds include 2-propenoic acid, 3-butenoic acid, 2-methylprop-2-enoic acid, butanethoic acid, 4-pentenoic acid, 5-hexenoic acid, 6-heptene acid, 7-octene acid, 8-nonene acid, 9-decene acid, 10-undecene acid and 11-dodecene acid. These carboxylic acids may also be used in the form of alkali metal salts and ammonium salts. Examples of alkali metal salts include lithium salt, sodium salt and potassium salt. Among these examples, 2-propenoic acid, 3-butenoic acid, 2-methylprop-2-enoic acid, butanedioic acid, 4-pentenoic acid, 5-hexenoic acid and salts thereof are preferable, and butanethoic acid and salts thereof are more preferable in terms of reducing residual inorganic particles (residual alumina) and scratches as well as improving the polishing rate.

Examples of the acrylamide compounds include acrylamide, N-methylacrylamide, N-(hydroxymethyl)acrylamide, N,N-dimethylacrylamide, N-ethylacrylamide, N,N-diethylacrylamide, and N-(isopropyl)acrylamide. Among these examples, acrylamide and N-methylacrylamide are preferable in terms of reducing residual inorganic particles (residual alumina) and scratches as well as improving the polishing rate.

In terms of reducing residual inorganic particles (residual alumina) and scratches as well as improving the polishing rate, the constitutional units other than those represented by the general formulas (I-a) to (I-d) and (II) account for preferably 0 to 30 mol %, more preferably 0 to 20 mol %, even more preferably 0 to 10 mol % and still more preferably 0 to 5 mol % of all of the constitutional units of the diallylamine polymer in content. It is still more preferable that the diallylamine polymer contains substantially no constitutional units other than those represented by the general formulas (I-a) to (I-d) and (II).

In terms of reducing residual inorganic particles (residual alumina) and scratches as well as improving the polishing rate, the total of the constitutional units represented by the general formulas (I-a) to (I-d) and the constitutional unit represented by the general formula (II) accounts for preferably 70 mol % or more, more preferably 80 mol % or more, even more preferably 90 mol % or more and still more preferably 100 mol % of all of the constitutional units of the diallylamine polymer in content.

Specific examples of the diallylamine polymer include: copolymers of diallylamine salt and acrylamide, diallylamine salt and methacrylamide, diallylamine salt and acrylic acid, diallylamine salt and methacrylic acid, and diallylamine salt and maleic acid; copolymers of methyldiallylamine salt and acrylamide, methyldiallylamine salt and methacrylamide, methyldiallylamine salt and acrylic acid, methyldiallylamine salt and methacrylic acid and methyldiallylamine salt and maleic acid; copolymers of diallyl dimethyl ammonium salt and acrylamide, diallyl methyl amine salt and acrylamide, diallyl dimethyl ammonium salt and methacrylamide, diallyl methyl-ethyl ammonium salt and methacrylamide, diallyl dimethyl ammonium salt and acrylic acid, diallyl methyl-ethyl ammonium salt and acrylic acid, diallyl dimethyl ammonium salt and methacrylic acid, diallyl methyl-ethyl ammonium salt and methacrylic acid, diallyl dimethyl ammonium salt and maleic acid, diallyl methyl-ethyl ammonium salt and maleic acid; and ternary copolymers of diallyl dimethyl ammonium salt, maleic acid and sulfur dioxide, diallyl methyl-ethyl ammonium salt, maleic acid and sulfur dioxide, acrylic acid, diallyl dimethyl ammonium salt and acrylamide, and acrylic acid, diallyl methyl-ethyl ammonium salt and acrylamide. Among these examples, copolymers of diallyl dimethyl ammonium salt and sulfur dioxide and diallyl diethyl ammonium salt and sulfur dioxide are preferable in terms of reducing residual inorganic particles (residual alumina) and scratches as well as improving the polishing rate.

[Method of Producing Diallylamine Polymer]

The diallylamine polymer can be produced by polymerizing, in a polar solvent in the presence of a radical initiator, acid addition salts and/or quaternary ammonium salts of diallylamines, and if needed sulfur dioxide and the compounds for introducing other constitutional units.

Examples of the polar solvent include water, inorganic acids (such as hydrochloric acid, sulfuric acid, phosphoric acid and polyphosphoric acid) and aqueous solutions thereof, aqueous solutions of metal salts of inorganic acids (such as zinc chloride, calcium chloride and magnesium chloride), organic acids (such as formic acid, acetic acid, proprionic acid and lactic acid) and aqueous solutions thereof, and polar organic solvents (such as alcohol, dimethylsulfoxide and dimethylformamide). A mixture of these examples may also be used. Among these examples, aqueous solvents are preferable.

A radical initiator having an azo group in the molecules and a persulfate-based radical initiator can be preferably used as the radical initiator. A persulfate-based radical initiator is preferable as the radical initiator.

Examples of acid additional salts of diallylamines include hydrochlorides, hydrobromates, sulfates, nitrates, sulfites, phosphates, amidesulfates and methansulfonates such as diallylamine, N-methyldiallylamine, N-ethyldiallylamine, N-propyldiallylamine, N-butyldiallylamine, N-2-hydroxyethyldiallylamine, N-2-hydroxypropyldiallylamine and N-3-hydroxypropyldiallylamine. Examples of quaternary ammonium salts of diallylamines include diallyl dimethyl ammonium chloride, diallyl dimethyl ammonium bromide, diallyl dimethyl ammonium iodide, diallyl dimethyl ammonium methyl sulfate, diallyl diethyl ammonium chloride, diallyl diethyl ammonium bromide, diallyl diethyl ammonium iodide, diallyl diethyl ammonium methyl sulfate, diallyl methyl-benzyl ammonium chloride, diallyl methyl-benzyl ammonium bromide, diallyl methyl-benzyl ammonium iodide, diallyl methyl-benzyl ammonium methyl sulfate, diallyl ethyl-benzyl ammonium chloride, diallyl ethyl-benzyl ammonium bromide, diallyl ethyl-benzyl ammonium iodide, diallyl ethyl-benzyl ammonium methyl sulfate, diallyl dimethyl ammonium ethyl sulfate and diallyl diethyl ammonium ethyl sulfate. Among these examples, diallyl dimethyl ammonium chloride, diallyl diethyl ammonium chloride, diallyl dimethyl ammonium ethyl sulfate, diallyl diethyl ammonium ethyl sulfate, and diallyl methyl-ethyl ammonium ethyl sulfate are preferable, and diallyl dimethyl ammonium chloride, diallyl diethyl ammonium ethyl sulfate and diallyl methyl-ethyl ammonium ethyl sulfate are more preferable in terms of reducing residual inorganic particles (residual alumina) and scratches as well as improving the polishing rate.

In terms of improving the polishing rate as well as reducing residual inorganic particles (residual alumina) and scratches, the diallylamine polymer has a weight-average molecular weight of preferably 1,000 to 500,000, more preferably 1,000 to 200,000, even more preferably 1,000 to 150,000, still more preferably 1,000 to 100,000, still more preferably 1,500 to 50,000, still more preferably 1,500 to 25,000, and still more preferably 1,500 to 4,000. The weight-average molecular weight can be determined by a method described in Examples.

In terms of improving the polishing rate, an upper limit to the content of the diallylamine polymer in the polishing liquid composition is preferably 0.100 wt % or less, more preferably 0.080 wt % or less, even more preferably 0.050 wt % or less, and still more preferably 0.040 wt % or less. In terms of reducing residual inorganic particles (residual alumina) and scratches, a lower limit to the content of the diallylamine polymer is preferably 0.008 wt % or more, more preferably 0.010 wt % or more, and still more preferably 0.020 wt % or more. Therefore, in terms of improving the polishing rate as well as reducing residual inorganic particles (residual alumina) and scratches, the content of the diallylamine polymer is preferably 0.008 to 0.100 wt %, more preferably 0.010 to 0.080 wt %, even more preferably 0.010 to 0.050 wt %, still more preferably 0.010 to 0.040 wt %, and still more preferably 0.020 to 0.040 wt %.

In terms of reducing residual inorganic particles (residual alumina) and scratches as well as improving the polishing rate, the content ratio of the diallylamine polymer to the alumina (content of diallylamine polymer/content of alumina) in the polishing liquid composition is preferably 0.001 to 0.1, more preferably 0.005 to 0.06, even more preferably 0.005 to 0.05, still more preferably 0.01 to 0.035 and still more preferably 0.01 to 0.02.

[Acid]

The polishing liquid composition of the present invention contains an acid in terms of improving the polishing rate. The use of an acid in the polishing liquid composition of the present invention includes in the form of an acid and/or a salt thereof. Examples of acids that can be used in the polishing liquid composition include inorganic acids such as nitric acid, sulfuric acid, sulfurous acid, persulfuric acid, hydrochloric acid, perchloric acid, phosphoric acid, phosphonic acid, phosphinic acid, pyrophosphoric acid, tripolyphosphoric acid and amidosulfuric acid; organic phosphonic acids such as 2-aminoethylphosphonic acid, 1-hydroxyethylidene-1,1-diphosphonic acid, aminotri(methylenephosphonic acid), ethylenediaminetetra(methylenephosphonic acid), diethylenetriaminepenta(methylenephosphonic acid), ethane-1,1-diphosphonic acid, ethane-1,1,2-triphosphonic acid, ethane-1-hydroxy-1,1-diphosphonic acid, ethane-1-hydroxy-1,1,2-triphosphonic acid, ethane-1,2-dicarboxy-1,2-diphosphonic acid, methanehydroxyphosphonic acid, 2-phosphonobutane-1,2-dicarboxylic acid, 1-phosphonobutane-2,3,4-tricarboxylic acid and α-methyl phosphonosuccinic acid; aminocarboxylic acids such as glutamic acid, picolinic acid and aspartic acid; and carboxylic acids such as citric acid, tartaric acid, oxalic acid, nitroacetic acid, maleic acid and oxalacetic acid. Among these examples, inorganic acids, carboxylic acids, and organic phosphonic acids are preferable in terms of the polishing rate and reducing roll off. Among the inorganic acids, phosphoric acid and sulfuric acid are more preferable. Among the carboxylic acids, citric acid, tartaric acid and maleic acid are more preferable, and citric acid and tartaric acid are still more preferable. Among the organic phosphonic acids, 1-hydroxyethylidene-1,1-diphosphonic acid, aminotri (methylenephosphonic acid), ethylenediaminetetra(methylenephosphonic acid), diethylenetriaminepenta(methylenephosphonic acid) and salts thereof are more preferable, and 1-hydroxyethylidene-1,1-diphosphonic acid and aminotri (methylenephosphonic acid) are still more preferable. These acids and salts thereof may be used alone or in combination of two or more. However, in terms of improving the polishing rate and reducing residual inorganic particles (residual alumina) and scratches, it is preferable to use the acids and salts thereof in combination of two or more, and it is more preferable to use two or more acids selected from the group consisting of phosphoric acid, sulfuric acid, citric acid, tartaric acid and 1-hydroxyethylidene-1,1-diphosphonic acid in combination.

Salts of these acids are not particularly limited in use, and specific examples of salts include metal salts, ammonium salts, and allylammonium salts. Specific examples of metals include those belonging to Group 1A, 1B, 2A, 2B, 3A, 3B, 4A, 6A, 7A and 8 in the periodic table (long period form). In particular, salts of metals belonging to Group 1A or ammonium salts are preferable in terms of improving the polishing rate.

In terms of improving the polishing rate as well as reducing residual inorganic particles (residual alumina) and scratches, the total content of the acids in the polishing liquid composition is preferably 0.001 to 5 wt %, more preferably 0.01 to 4 wt %, even more preferably 0.05 to 3 wt %, and still more preferably 0.1 to 2 wt %.

[Water]

The polishing liquid composition of the present invention contains water as a medium. For example, distilled water, ion exchanged water, pure water and extra pure water can be used in the polishing liquid composition. The content of the water in the polishing liquid composition is preferably 65 to 99 wt %, more preferably 70 to 98 wt %, even more preferably 80 to 97 wt %, and still more preferably 85 to 97 wt % so that the polishing liquid composition can be handled with ease.

[Silica Particles]

In terms of reducing residual alumina, scratches and the waviness of the substrate surface, it is preferable that the polishing liquid composition of the present invention further contains silica particles in addition to the alumina particles as the inorganic particles. When being used together with an amine compound, silica particles tend to agglomerate, whereby causing a decline in the polishing rate. However, with the diallylamine polymer, a decline in the polishing rate is less likely to occur even when silica particles are used in combination. For this reason, it is possible to reduce residual alumina and scratches in an effective manner without loss of the productivity. For example, colloidal silica, fumed silica or surface-modified silica may be used as the silica particles. In particular, colloidal silica is preferable in terms of reducing the waviness of the substrate surface and residual alumina.

In terms of reducing residual alumina, scratches and the waviness of the substrate surface as well as improving the polishing rate, the primary particles of the silica particles have an average particle size of preferably 35 to 150 nm, more preferably 40 to 100 nm, even more preferably 45 to 80 nm, and still more preferably 45 to 60 nm. The average particle size can be determined by the method described in Examples.

Further, in terms of reducing residual alumina, scratches and the waviness of the substrate surface as well as improving the polishing rate, the standard deviation in number-basis particle size of the silica particles is preferably 8 to 35 nm, more preferably 10 to 30 nm, and still more preferably 15 to 25 nm. The standard deviation can be determined by a method described in Examples.

When using the alumina particles and the silica particles in combination, the weight ratio of the alumina particles to the silica particles (weight of alumina/weight of silica) is preferably 10/90 to 60/40, more preferably 15/85 to 50/50, even more preferably 20/80 to 40/60, still more preferably 20/80 to 35/65, and still more preferably 20/80 to 30/70 in terms of reducing residual alumina, scratches and the waviness of the substrate surface as well as improving the polishing rate.

When using the α-alumina and the silica particles in combination, the ratio of the secondary particles of the α-alumina to the primary particles of the silica particles in average particle size (average particle size of α-alumina secondary particles/average particle size of silica primary particles) is preferably 1 to 100, more preferably 2 to 50, even more preferably 5 to 20 and still more preferably 5 to 10 in terms of reducing residual alumina, scratches and the waviness of the substrate surface as well as improving the polishing rate.

In terms of reducing residual alumina, scratches and the waviness of the substrate surface as well as improving the polishing rate, the content of the silica particles in the polishing liquid composition of the present invention is preferably 0.1 wt % or more, more preferably 0.5 wt % or more, even more preferably 1 wt % or more, and still more preferably 2 wt % or more. Further, in terms of reducing the waviness of the substrate surface and from an economic standpoint, the content of the silica particles is preferably 30 wt % or less, more preferably 25 wt % or less, even more preferably 20 wt % or less, still more preferably 15 wt % or less, still more preferably 10 wt % or less, and still more preferably 5 wt % or less. Therefore, in terms of reducing residual alumina and the waviness of the substrate surface and improving the polishing rate and from an economic standpoint, the content of the silica particles is preferably 0.1 to 30 wt %, more preferably 0.5 to 25 wt %, even more preferably 1 to 20 wt %, still more preferably 2 to 15 wt %, still more preferably 2 to 10 wt %, and still more preferably 2 to 5 wt %.

[Oxidizing Agent]

In terms of improving the polishing rate as well as reducing residual inorganic particles (residual alumina) and scratches, it is preferable that the polishing liquid composition of the present invention contains an oxidizing agent. Examples of oxidizing agents that can be used in the polishing liquid composition of the present invention include peroxides, permanganic acid or salts thereof, chromic acid or salts thereof, peroxo acid or salts thereof, oxo acid or salts thereof, metal salts, nitric acids, and sulfuric acids in terms of improving the polishing rate as well as reducing residual inorganic particles (residual alumina) and scratches.

Example of the peroxides include hydrogen peroxide, sodium peroxide and barium peroxide, examples of the permanganic acid or salts thereof include potassium permanganate, examples of the chromic acid or salts thereof include metal chromate and metal dichromate, examples of the peroxo acid or salts thereof include peroxodisulfuric acid, ammonium peroxodisulfate, metal peroxodisulfate, peroxophosphoric acid, peroxosulfuric acid, sodium peroxoborate, performic acid, peracetic acid, perbenzoic acid and perphthalic acid, examples of the oxo acid or salts thereof include hypochlorous acid, hypobromous acid, hypoiodous acid, chloric acid, bromic acid, iodic acid, sodium hypochlorite, and calcium hypochlorite, and examples of the metal salts include iron(III) chloride, iron(III) sulfate, iron(III) nitrate, iron(III) citrate, and ammonium iron(III) sulfate.

Examples of preferred oxidizing agents include hydrogen peroxide, iron(III) nitrate, peracetic acid, ammonium peroxodisulfate, iron(III) sulfate and ammonium iron(III) sulfate. Examples of more preferred oxidizing agents include hydrogen peroxide because it is inexpensive and can be used for general purposes and metal ions do not attach to its surface. These oxidizing agents may be used alone or in combination of two or more.

In terms of improving the polishing rate, the content of the oxidizing agent in the polishing liquid composition is preferably 0.01 wt % or more, more preferably 0.05 wt % or more, and still more preferably 0.1 wt % or more. Further, in terms of improving the polishing rate and reducing residual abrasive grains, the content of the oxidizing agent is preferably 4 wt % or less, more preferably 2 wt % or less, and still more preferably 1.5 wt % or less. Therefore, to improve the polishing rate while assuring the surface quality, the content of the oxidizing agent is preferably 0.01 to 4 wt %, more preferably 0.05 to 2 wt %, and still more preferably 0.1 to 1.5 wt %.

[Other Components]

Other components can also be blended into the polishing liquid composition of the present invention as needed. Examples of other components include thickeners, dispersants, rust-preventive agents, basic materials, surfactants and polymer compounds. The content of these voluntary components in the polishing liquid composition is preferably 0 to 10 wt %, and more preferably 0 to 5 wt %.

[pH of Polishing Liquid Composition]

In terms of improving the polishing rate as well as reducing residual inorganic particles (residual alumina) and scratches, the polishing liquid composition of the present invention is adjusted, with the use of any of the acids mentioned above, to have a pH of preferably 1 to 6, more preferably 1 to 4, even more preferably 1 to 3, and still more preferably 1 to 2.

[Method of Preparing Polishing Liquid Composition]

The polishing liquid composition of the present invention can be prepared by, for example, mixing alumina particles, the diallylamine polymer, acids and water, and if desired silica particles, an oxidizing agent, and other components by a known method. When mixing silica particles, the silica particles may be mixed in the form of concentrated slurry or may be mixed after being diluted with water or the like. The content and concentration of each component in the polishing liquid composition of the present invention are in the ranges as described above. As another aspect, the polishing liquid composition of the present invention may be prepared in the form of a concentrate. The mixing is not particularly limited, and can be carried out using an agitator such as a homo-mixer, a homogenizer, an ultrasonic disperser and a wet ball mill.

[Method of Producing Magnetic Disk Substrate]

Viewed from another aspect, the present invention relates to a method of producing a magnetic disk substrate (hereinafter referred also to as "the substrate production method of the present invention"). The substrate production method of the present invention is a method of producing a magnetic disk substrate, which includes a step of polishing a substrate to be polished using the polishing liquid composition of the present invention described above (hereinafter referred also to as "the polishing step using the polishing liquid composition of the present invention"). As a result, magnetic disk substrates with reduced residual inorganic particles (residual alumina) and scratches after polishing can be provided through the polishing step with an improved polishing rate. The substrate production method of the present invention is particularly suited to a method of producing a magnetic disk substrate for the perpendicular magnetic recording system. Hence, viewed from another aspect, the substrate production method of the present invention is a method of producing a magnetic disk substrate for the perpendicular magnetic recording system, which includes the polishing step using the polishing liquid composition of the present invention.

Specific examples of ways to polish a substrate to be polished using the polishing liquid composition of the present invention include sandwiching the substrate to be polished between platens to which a polishing pad such as an organic polymer-based polishing cloth in the form of nonwoven fabric is attached, and moving the platens and/or the substrate to be polished to polish the substrate to be polished while feeding the polishing liquid composition of the present invention to a polishing machine.

When a plurality of polishing steps are employed to polish the substrate to be polished, it is preferable that the polishing step using the polishing liquid composition of the present invention is carried out prior to the final polishing. In so doing, it is preferable that a separate polishing machine is used in each polishing step, and it is more preferable that the substrate to be polished is cleaned after each polishing step in order to prevent the entry of abrasives and polishing liquid compositions used in the prior steps. The polishing liquid composition of the present invention can also be used in circular polishing in which a polishing liquid used is recycled. Polishing machines are not particularly limited and known polishing machines for polishing magnetic disk substrates can be used. The polishing step using the polishing liquid composition of the present invention preferably includes supplying the polishing liquid composition of the present invention to the target surface of the substrate to be polished, brining a polishing pad into contact with the target surface, and moving the polishing pad and/or the substrate to be polished to polish the target surface.

[Polishing Pad]

A polishing pad to be used in the present invention is not particularly limited, and it is possible to use suede type, nonwoven fabric type and polyurethane closed-cell foam type polishing pads and two-layer type polishing pads in which the mentioned materials are laminated. However, in terms of improving the polishing rate, a suede type polishing pad is preferable.

[Polishing Load]

A polishing load refers to pressure applied to the surface to be polished of the substrate to be polished by the platens at the time of polishing. In terms of reducing residual alumina, the polishing load in the substrate production method of the present invention is preferably 50 kPa or less, more preferably 40 kPa or less, even more preferably 30 kPa or less, and still more preferably 15 kPa or less. Further, in terms of improving the polishing rate, the polishing load is preferably 3 kPa or more, more preferably 5 kPa or more, even more preferably 7 kPa or more, and still more preferably 10 kPa or more. Therefore, the polishing load is preferably 3 to 50 kPa, more preferably 5 to 40 kPa, even more preferably 7 to 30 kPa, and still more preferably 10 to 15 kPa. The polishing load can be adjusted by loading the platens and the substrate with air pressure, a weight, or the like.

[Feeding of Polishing Liquid Composition]

In terms of cost reductions, the rate at which the polishing liquid composition is fed during the polishing step is preferably 25 ml/min or less, more preferably 0.2 ml/min or less, even more preferably 0.15 ml/min or less, and still more preferably 0.1 ml/min or less per 1 $cm^2$ of the substrate to be polished. Further, in terms of improving the polishing rate, the rate at which the polishing liquid composition is fed is preferably 0.01 ml/min or more, more preferably 0.025 ml/min or more, and still more preferably 0.05 ml/min or more per $cm^2$ of the substrate to be polished. Therefore, the rate at which the polishing liquid composition is fed is preferably 0.01 to 0.25 ml/min, more preferably 0.025 to 0.2 ml/min, even more preferably 0.05 to 0.15 ml/min, and still more preferably 0.05 to 0.1 ml/min per 1 $cm^2$ of the substrate to be polished.

Examples of ways to feed the polishing liquid composition of the present invention to the polishing machine include feeding the polishing liquid composition continuously with a pump, for example. In addition to feeding the polishing liquid composition to the polishing machine as a single liquid containing all of the components, the polishing liquid composition can be divided into a plurality of blending component liquids to be fed as two or more liquids in view of, for example, the storage stability of the polishing liquid composition. In the latter case, the plurality of blending component liquids are mixed together, for example, in a feeding pipe or on the substrate to be polished, to serve as the polishing liquid composition of the present invention.

[Substrate to be Polished]

The substrate to be polished used in the substrate production method of the present invention is a magnetic disk substrate. Specific examples of such a substrate include an Ni—P plated aluminum alloy substrate and a glass substrates such as those made of silicate glass, aluminosilicate glass, crystallized glass and tempered glass. Among these examples, an Ni—P plated aluminum alloy substrate is suitable.

According to the present invention, it is possible to provide polishing with an improved polishing rate and a magnetic disk substrate with reduced residual alumina after polishing. Thus, the polishing liquid composition of the present invention can be suitably used in polishing magnetic disk substrates for the perpendicular magnetic recording system, for which a high level of surface smoothness is required.

The shape of the substrate to be polished is not particularly limited, and the substrate may have a shape with a planar portion such as a disk shape, a plate shape, a slab shape and a prism shape, or a shape with a curved portion such as a lens. In particular, a disk-shaped substrate to be polished is suitable. For a disk-shaped substrate to be polished, the outer diameter thereof is, for example, about 2 to 95 mm and the thickness thereof is, for example, about 0.5 to 2 mm.

[Polishing Method]

Viewed from another aspect, the present invention relates to a polishing method including feeding the polishing liquid composition of the present invention to the target surface of the substrate to be polished, brining a polishing pad into contact with the target surface, and moving the polishing pad and/or the substrate to be polished to polish the target surface. By using the polishing method of the present invention, it is possible to provide polishing with an improved polishing rate and magnetic disk substrates, particularly magnetic disk substrates for the perpendicular magnetic recording system with reduced residual alumina after polishing. Examples of the substrate to be polished by the polishing method of the present invention include those used in the production of magnetic disk substrates and substrates for magnetic recording media as described above. In particular, those used in the production of magnetic disk substrates for the perpendicular magnetic recording system are preferable. The specific ways and conditions for polishing are as described above. The polishing method of the present invention may include circular polishing in which the polishing liquid composition of the present invention once used is recycled.

EXAMPLES

Examples 1 to 11 and Comparative Examples 1 to 7

Polishing liquid compositions of Examples 1 to 11 and Comparative Examples 1 to 7 were prepared, and then substrates to be polished were polished using each polishing liquid composition. For each polishing liquid composition, the polishing rate, and residual alumina and scratches on the substrate surface after the polishing were evaluated. The method of preparing each polishing liquid composition, the copolymers used, the method of measuring each parameter, the polishing conditions (polishing method) and the evaluation methods are as follows.

1. Preparation of Polishing Liquid Compositions

The polishing liquid compositions of Examples 1 to 11 and Comparative Examples 1 to 7 were each prepared using α-alumina (average particle size of secondary particles: 0.3 μm), θ-alumina (average particle size of secondary particles: 0.16 μm), colloidal silica (average particle size of primary particles: 48.1 nm, standard deviation in particle size: 20.7 nm), a diallylamine polymer shown in Table 1 below (all of the diallylamine polymers were manufactured by Nitto Boseki Co., Ltd.), citric acid, tartaric acid, sulfuric acid, hydrogen peroxide and water.

The content of each component in each polishing liquid composition was as follows: α-alumina 0.72 wt %, θ-alumina 0.24 wt % (total of alumina particles 0.96 wt %), colloidal silica 2.88 wt %, sulfuric acid 0.4 wt %, tartaric acid 0.01 wt %, citric acid 0.5 wt %, and hydrogen peroxide 1.2 wt %. Each polishing liquid composition had a pH of 1.4.

The content of the diallylamine polymer in each of the polishing liquid compositions of Examples 1 to 11 was 0.01 wt %. The following amine compounds were used in Comparative Examples 2 to 7 instead of using a diallylamine polymer. The content of each amine compound was 0.01 wt %. In Comparative Example 1, the polishing liquid composition contained no amine compound.

Comparative Example 2: polyethyleneimine (manufactured by Nippon Shokubai Co., Ltd.)

Comparative Example 3: dodecyltrimethylammonium chloride (manufactured by Tokyo Chemical Industry Co., Ltd.)

Comparative Example 4: alkyl benzyl ammonium chloride (SANISOL C, manufactured by Kao Corporation)

Comparative Example 5: lauryl dimethyl aminoacetatic acid betaine (AMPHITOL 24B, manufactured by Kao Corporation)

Comparative Example 6: ethylenediamine (manufactured by Wako Pure Chemical Industries, Ltd.)

Comparative Example 7: triethylenetetraamine (manufactured by Tosoh Corporation)

TABLE 1

| | Diallylamine polymer | | | | | |
|---|---|---|---|---|---|---|
| | | Constitutional units | | | Composition | | Weight-average |
| No. | First constitutional unit (Formula I component) | Second constitutional unit (Formula II component) | Third constitutional unit | mol % (FI/FII/other) | Abbreviation | molecular weight |
| 1 | Formula (I-c): $R^2 = CH_3$, $R^3 = CH_3$, D = Cl (monomer: N,N-diallyl(N,N-dimethyl)ammonium chloride) | Formula (II): $-SO_2-$ | — | 50:50:0 | DADMAC/SO2 (50/50) | 4,000 |
| 2 | Formula (I-c): $R^2 = CH_3$, $R^3 = CH_3$, D = Cl (monomer: N,N-diallyl(N,N-dimethyl)ammonium chloride) | Formula (II): $-SO_2-$ | — | 50:50:0 | DADMAC/SO2 (50/50) | 1,500 |

TABLE 1-continued

Diallylamine polymer

| No. | First constitutional unit (Formula I component) | Second constitutional unit (Formula II component) | Third constitutional unit | Composition mol % (FI/FII/other) | Abbrevation | Weight-average molecular weight |
|---|---|---|---|---|---|---|
| 3 | Formula (I-c): $R^2 = CH_3CH_2$, $R^3 = CH_3CH_2$, $D = CH_3CH_2SO_4$ (monomer: N,N-diallyl(N,N-diethyl)ammonium ethyl sulfate) | Formula (II): $—SO_2—$ | — | 50:50:0 | diallyl diethyl ammonium ethyl sulfate/SO2 (50/50) | 1,500 |
| 4 | Formula (I-c): $R^2 = CH_3$, $R^3 = CH_3CH_2$, $D = CH_3CH_2SO_4$ (monomer: N,N-diallyl(N-methyl-N-ethyl)ammonium ethyl sulfate) | Formula (II): $—SO_2—$ | (monomer:triallylamine) | 50:40:10 | diallyl methyl-ethyl ammonium ethyl sulfate/SO2/triallylamine (50/40/10) | 3,000 |
| 5 | Formula (I-c): $R^2 = CH_3$, $R^3 = CH_3$, $D = Cl$ (monomer: N,N-diallyl(N,N-dimethyl)ammonium chloride) | Formula (II): $—SO_2—$ | $—CH(COOH)—CH(COOH)—$ | 50:25:25 | DADMAC/SO2/maleic acid (50/25/25) | 23,000 |
| 6 | Formula (I-c): $R^2 = CH_3$, $R^3 = CH_3$, $D = Cl$ (monomer: N,N-diallyl(N,N-dimethyl)ammonium chloride) | — | $—CH_2—CH(CONH_2)—$ | 50:0:50 | DADMAC/AM | 10,000 |
| 7 | Formula (I-c): $R^2 = CH_3$, $R^3 = CH_3$, $D = Cl$ (monomer: N,N-diallyl(N,N-dimethyl)ammonium chloride) | — | — | 100:0:0 | DADMAC | 8,500 |
| 8 | Formula (I-c): $R^2 = CH_3$, $R^3 = CH_3$, $D = Cl$ (monomer: N,N-diallyl(N,N-dimethyly)ammonium chloride | — | — | 100:0:0 | DADMAC | 40,000 |
| 9 | Formula (I-c): $R^2 = CH_3$, $R^3 = CH_3$, $D = Cl$ (monomer: N,N-diallyl(N,N-dimethyl)ammonium chloride) | — | — | 100:0:0 | DADMAC | 200,000 |
| 10 | Formula (I-a): $R^1 = CH_3$ (monomer: N,N-diallyl(N-methyl)ammonium chloride) | — | — | 100:0:0 | diallyl methyl ammonium chrloride | 5,000 |
| 11 | Formula (I-a): $R^1 = H$ (monomer: N,N-diallylammonium chloride) | — | — | 100:0:0 | diallylammonium chloride | 110,000 |

2. Method of Measuring Each Parameter

[Measurement of Average Particle Size of Secondary Particles of Alumina Particles]

A 0.5% sodium polyacrylate aqueous solution (POIZ 530 manufactured by Kao Corporation, molecular weight: 400) was put in the following measuring device as a dispersion medium, and then a sample was put in the device such that the transmittance would be 75 to 95%. Subsequently, ultrasound was applied to the sample for 5 minutes, and then the particle size was determined.

Measuring device: laser beam diffraction/scattering particle size distribution analyzer LA-920 manufactured by HORIBA Ltd.

Circulation strength: 4
Ultrasonic intensity: 4

[Measurement of Average Particle Size and Standard Deviation in Number-Basis Particle Size of Primary Particles of Silica Particles]

Silica particles were observed under a transmission electron microscope (TEM) (Trade name: "JEM-2000FX", 80 kV, 10,000-50,000× manufactured by JEOL Ltd.), and the TEM images were photographed and scanned into a personal computer as image data using a scanner. Then, the diameter of a circle having the same area as the projected area of each silica particle was calculated for 1,000 or more silica particle data with analysis software "WinROOF" (commercially available from Mitani Corporation). Using the resultant diameters of the individual silica particles, the standard deviation (sample standard deviation) in number-basis particle size was determined with spreadsheet software "EXCEL" (manufactured by Microsoft Corporation). Moreover, on the basis of the silica particle size distribution data obtained by converting the particle diameter into a particle volume with the spreadsheet software "EXCEL", the proportion (percent by volume) of the particles having a specific particle size in the whole particles was expressed as a cumulative frequency from a smaller particle size side, thereby obtaining the cumulative volume frequency N. On the basis of the particle size and the cumulative volume frequency data of the silica particles thus determined, the cumulative volume frequency was plotted against the particle size, so that a graph of particle size versus cumulative volume frequency was obtained. In this graph, a particle size at which the cumulative volume frequency of the silica particles from the smaller particle size side reaches 50% was defined as the volume median diameter of the silica particles.

[Measurement of Weight-Average Molecular Weight]

The weight-average molecular weight (Mw) of each diallylamine polymer was determined by gel permeation chromatography (GPC) using a high performance liquid chromatograph Hitachi L-6000. Hitachi L-6000 was used as a pump for an eluent flow path, a differential refractometer Showdex® RISE-61 was used as a detector, aqueous gel permeation type columns Asahipak GS-220HQ (elimination limit molecule quantity: 3,000) and GS-620HQ (elimination limit molecule quantity: 2,000,000) being connected to each other were used as a column. Each sample was adjusted with an eluent to have a concentration of 0.5 g/100 ml, and 20 µl of each sample was used. A 0.4 mol/L sodium chloride aqueous solution was used as the eluent. The measurement was carried out at a column temperature of 30° C. and a flow rate of 1.0 ml/min. Polyethylene glycols having a molecular weight of 106, 194, 440, 600, 1,470, 4,100, 7,100, 10,300, 12,600, and 23,000 were used as standard samples to determine a calibration curve, and based on the calibration curve the weight-average molecular weight (Mw) of each polymer was determined.

3. Polishing of Substrates

Substrates to be polished were polished using the polishing liquid compositions prepared in Examples 1 to 11 and Comparative Examples 1 to 7 under the following polishing conditions, followed by washing with pure water, thus obtaining substrates to be evaluated.

[Substrates to be Polished]

Ni—P plated aluminum alloy substrates were used as the substrates to be polished. The substrates to be polished each had a thickness of 1.27 mm and a diameter of 95 mm.

[Polishing Conditions]

Polishing test machine: double side polisher (Double side 9B polisher manufactured by SpeedFam Company Limited)

Polishing pad: thickness: 1.04 mm, average pore diameter: 43 µm (manufactured by FILWEL Co., Ltd.)

Number of revolutions of platen: 45 rpm

Polishing load: 12.3 kPa (set value)

Amount of polishing liquid fed: 100 ml/min (0.076 ml/(cm$^2$·min))

Amount polished (one side): 120 mg

Number of substrates introduced: 10

4. Evaluation Method

[Evaluation of Polishing Rate]

The polishing rate of each polishing liquid composition was evaluated by the following method. First, the weight of each substrate before and after polishing was measured using a weighing machine ("BP-210S" manufactured by Sartorius AG.), and a change in weight was determined for each substrate. An average value of 10 substrates was taken as the amount reduced, and a value obtained by dividing the amount reduced by the polishing time was taken as the rate of weight reduction. The rate of weight reduction was introduced in the following equation, and converted to a polishing rate (µm/min). The results are provided in Table 2 below as relative values, with Comparative Example 1 taken as 100.

Polishing rate (µm/min)=Rate of weight reduction (g/min)/Area of one side of substrate (mm$^2$)/Ni—P plating density (g/cm$^3$)×10$^6$ (calculated taking the area of one side of the substrate as 6597 mm$^2$, and the Ni—P plating density as 7.9 g/cm$^3$)

[Method of Evaluating Residual Inorganic Particles and Scratches]

Measuring device: OSA7100 manufactured by KLA-Tencor Corporation

Evaluation: four substrates were randomly selected from the substrates placed in the polishing test machine, and each of the selected substrates was irradiated with laser light at 10,000 rpm, and residual inorganic particles and scratches were measured. The total number of the residual inorganic particles and the scratches present on both sides of each of the four substrates were each divided by 8 to give the numbers of the residual inorganic particles and the scratches per substrate surface. The results are provided in Table 2 as relative values, with Comparative Example 1 taken as 100.

TABLE 2

| | Polishing liquid compositions | | Evaluation results | | |
|---|---|---|---|---|---|
| | (abrasive grains: alumina and silica) | | Polishing | Residual inorganic | |
| | Amine compounds | Molecular weight | rate (relative value) | particles (relative value) | Scratches (relative value) |
| Ex. 1 | DADMAC/SO2 (50/50) | 4,000 | 97 | 29 | 51 |
| Ex. 2 | DADMAC/SO2 (50/50) | 1,500 | 99 | 29 | 50 |
| Ex. 3 | diallyl diethyl ammonium sulfate/SO2 (50/50) | 1,500 | 99 | 27 | 53 |
| Ex. 4 | diallyl methyl-ethyl ammonium ethyl sulfate/SO2/triallylamine (50/40/10) | 3,000 | 99 | 25 | 49 |
| Ex. 5 | DADMAC/SO2/maleic acid (50/25/25) | 23,000 | 97 | 38 | 62 |
| Ex. 6 | DADMAC/AM | 10,000 | 98 | 36 | 69 |
| Ex. 7 | DADMAC | 8,500 | 98 | 32 | 72 |
| Ex. 8 | DADMAC | 40,000 | 98 | 33 | 75 |
| Ex. 9 | DADMAC | 200,000 | 98 | 35 | 74 |
| Ex. 10 | diallyl methyl ammonium chloride | 5,000 | 95 | 71 | 85 |
| Ex. 11 | diallylammonium chloride | 110,000 | 86 | 98 | 88 |
| Comp. Ex. 1 | — | — | 100 | 100 | 100 |
| Comp. Ex. 2 | polyethylene imine | 600 | 80 | 36 | 96 |
| Comp. Ex. 3 | dodecyltrimethylammonium chloride | 263 | 99 | 532 | 152 |
| Comp. Ex. 14 | alkyl benzyl ammonium chloride | 339 | 98 | 331 | 102 |
| Comp. Ex. 5 | lauryl dimethyl aminoacetic acid betaine | 2,713 | 99 | 202 | 105 |
| Comp. Ex. 6 | ethylenediamine | 60 | 97 | 306 | 98 |
| Comp. Ex. 7 | triethylenetetraamine | 146 | 93 | 103 | 90 |

As can be seen from Table 2, the polishing liquid compositions of Examples 1 to 11 were able to reduce the residual inorganic particles and the scratches while maintaining a high polishing rate in comparison with the polishing liquid compositions of Comparative Examples 1 to 7.

Examples 12 to 15 and Comparative Examples 8 to 10

Polishing liquid compositions of Examples 12 to 14 and Comparative Examples 8 to 11 were prepared in the same manner as in Example 1 except that the amount of the diallylamine polymers (No. 1) added was changed to 0 or 0.005 to 1.0 wt %. Next, substrates to be polished were polished under the same conditions as in Example 1, and then the polishing rate, residual inorganic particles and scratches were evaluated for each polishing liquid composition. The results are provided in Table 3 below as relative values, with Comparative Example 8 taken as 100.

As can be seen from Table 4, the polishing liquid compositions of Examples 16 and 17 were able to reduce the residual alumina and the scratches while maintaining a high polishing

TABLE 3

| | Polishing liquid compositions | | | | | Evaluation results | | |
|---|---|---|---|---|---|---|---|---|
| | Abrasive grains | | Amine compounds | | | Polishing rate | Residual inorganic particles | Scratches |
| | Type | Content (wt %) | Type | Molecular weight | Amount added (wt %) | (Relative value) | (Relative value) | (Relative value) |
| Ex. 12 | Alumina/silica | 0.96/2.88 | DADMAC/SO2 (50/50) | 4,000 | 0.010 | 97 | 29 | 51 |
| Ex. 13 | Alumina/silica | 0.96/2.88 | DADMAC/SO2 (50/50) | 4,000 | 0.030 | 96 | 27 | 50 |
| Ex. 14 | Alumina/silica | 0.96/2.88 | DADMAC/SO2 (50/50) | 4,000 | 0.050 | 93 | 27 | 50 |
| Ex. 15 | Alumina/silica | 0.96/2.88 | DADMAC/SO2 (50/50) | 4,000 | 0.100 | 81 | 27 | 51 |
| Comp. Ex. 8 | Alumina/silica | 0.96/2.88 | Not added | — | — | 100 | 100 | 100 |
| Comp. Ex. 9 | Alumina/silica | 0.96/2.88 | DADMAC/SO2 (50/50) | 4,000 | 0.005 | 97 | 88 | 85 |
| Comp. Ex. 10 | Alumina/silica | 0.96/2.88 | DADMAC/SO2 (50/50) | 4,000 | 1.000 | 42 | 118.9 | 153 |

As can be seen from Table 3, the polishing liquid compositions of Examples 12 to 15 were able to reduce the residual inorganic particles and the scratches while maintaining a high polishing rate in comparison with the polishing liquid compositions of Comparative Examples 8 to 10.

Examples 16 and 17 and Comparative Example 11

Polishing liquid compositions of Examples 16 and 17 and Comparative Example 11 were prepared in the same manner as in Examples 1 and 7 and Comparative Example 1, respectively, except that abrasive grains of alumina (α-alumina: 3.00 wt %, θ-alumina: 1.00 wt % (total of alumina particles: 4.00 wt %) were used alone as abrasive grains without using silica particles. Next, substrates to be polished were polished under the same conditions as in Example 1, and then the polishing rate, residual alumina and scratches were evaluated for each polishing liquid composition. The results are provided in Table 4 below as relative values, with Comparative Example 11 taken as 100.

rate in comparison with the polishing liquid composition of Comparative Example 11.

The invention may be embodied in other forms without departing from the spirit of essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A polishing liquid composition for a magnetic disk substrate, comprising inorganic particles, a diallylamine polymer, an acid and water,
   wherein the inorganic particles include alumina particles and silica particles,
   wherein the diallylamine polymer includes one or more constitutional units selected from the group consisting of constitutional units represented by the following gen-

TABLE 4

| | Polishing liquid compositions | | | | | Evaluation results | | |
|---|---|---|---|---|---|---|---|---|
| | Abrasive grains | | Amine compounds | | | Polishing rate | Residual inorganic particles | Scratches |
| | Type | Content (wt %) | Type | Molecular weight | Amount added (wt %) | (Relative value) | (Relative value) | (Relative value) |
| Ex. 16 | Alumina | 4.00 | DADMAC/SO2 (50/50) | 4,000 | 0.030 | 98 | 35 | 58 |
| Ex. 17 | Alumina | 4.00 | DADMAC | 8,500 | 0.030 | 97 | 40 | 68 |
| Comp. Ex. 11 | Alumina | 4.00 | Not added | — | — | 100 | 100 | 100 | eral formulas (I-a), (I-b), (I-c) and (I-d), and the content of the diallylamine polymer in the polishing liquid composition is 0.020 to 0.080 wt %,

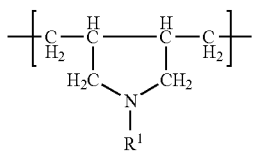 (I-a)

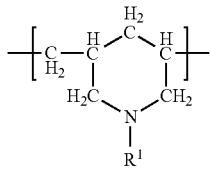 (I-b)

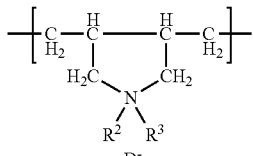 (I-c)

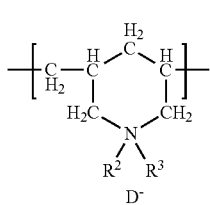 (I-d)

where $R^1$ in the general formulas (I-a) and (I-b) is a hydrogen atom or an alkyl group having a carbon number of 1 to 10 or aralkyl group having a carbon number of 7 to 10 that may have a hydroxyl group, $R^2$ in the general formulas (I-c) and (I-d) is an alkyl group having a carbon number of 1 to 10 or aralkyl group having a carbon number of 7 to 10 that may have a hydroxyl group, $R^3$ is an alkyl group having a carbon number of 1 to 4 or aralkyl group having a carbon number of 7 to 10 and $D^-$ is a monovalent anion, wherein the diallylamine polymer further includes a constitutional unit represented by the following general formula (II)

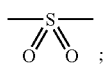 (II)

wherein a mole ratio of the constitutional units represented by the general formulas (I-a) to (I-d) to the constitutional unit represented by the general formula (II) (general formulas (I-a) to (I-d)/general formula (II)) is 60/40 to 40/60 in all of the constitutional units of the diallylamine polymer.

2. The polishing liquid composition according to claim 1, wherein the diallylamine polymer has a weight-average molecular weight of 1,000 to 500,000.

3. The polishing liquid composition according to claim 1, wherein a total of the constitutional units represented by the general formulas (I-a), (I-b), (I-c) and (I-d) accounts for 30 to 60 mol % of all of the constitutional units of the diallylamine polymer in content.

4. The polishing liquid composition according to claim 1, wherein the constitutional unit represented by the general formula (II) accounts for 10 to 60 mol % of all of the constitutional units of the diallylamine polymer in content.

5. The polishing liquid composition according to claim 1, wherein a total of the constitutional units represented by the general formulas (I-a) to (I-d) and the constitutional unit represented by the general formula (II) accounts for 70 mol % or more of all of the constitutional units of the diallylamine polymer in content.

6. The polishing liquid composition according to claim 1, wherein the content of the diallylamine polymer in the polishing liquid composition is 0.020 to 0.050 wt %.

7. The polishing liquid composition according to claim 1, wherein the polishing liquid composition has a pH of 1 to 3.

8. The polishing liquid composition according to claim 1, wherein a weight ratio of the alumina particles to the silica particles (weight of alumina particles/weight of silica particles) is 10/90 to 70/30.

9. The polishing liquid composition according to claim 1, wherein a content ratio of the diallylamine polymer to the alumina particles in the polishing liquid composition (content of diallylamine polymer/content of alumina particles) is 0.001 to 0.1.

10. The polishing liquid composition according to claim 1, wherein the alumina particles include α-alumina and intermediate alumina.

11. The polishing liquid composition according to claim 10, wherein the content of the α-alumina in the alumina particles is 30 to 90 wt %.

12. The polishing liquid composition according to claim 10, wherein the content of the intermediate alumina in the alumina particles is 10 to 70 wt %.

13. The polishing liquid composition according to claim 10, wherein a weight ratio of the α-alumina to the intermediate alumina (percent by weight of α-alumina/percent by weight of intermediate alumina) in the alumina particles is 95/5 to 10/90.

14. The polishing liquid composition according to claim 1, wherein the content of the alumina particles in the polishing liquid composition is 0.05 wt % or more and 30 wt % or less.

15. The polishing liquid composition according to claim 1, wherein the content of the alumina particles in the polishing liquid composition is 0.05 to 30 wt %.

16. The polishing liquid composition according to claim 1, wherein the diallylamine polymer is a copolymer of diallyl dimethyl ammonium chloride and sulfur dioxide.

17. A method of producing a magnetic disk substrate, comprising a step of polishing an Ni—P plated aluminum alloy substrate or glass substrate using the polishing liquid composition according to claim 1.

18. A method of polishing a magnetic disk substrate, comprising a step of polishing an Ni—P plated aluminum alloy substrate or glass substrate using the polishing liquid composition according to claim 1, and a step of final polishing the substrate.

* * * * *